(12) United States Patent
Lee et al.

(10) Patent No.: US 11,003,905 B2
(45) Date of Patent: May 11, 2021

(54) METHOD AND APPARATUS FOR IRIS RECOGNITION

(71) Applicant: Samsung Electronics Co., Ltd., Gyeonggi-do (KR)

(72) Inventors: Gyubong Lee, Gyeonggi-do (KR); Youngkwon Yoon, Seoul (KR); Moonsoo Kim, Seoul (KR); Taeho Kim, Chungcheongbuk-do (KR); Kihuk Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/272,614

(22) Filed: Feb. 11, 2019

(65) Prior Publication Data

US 2019/0171877 A1 Jun. 6, 2019

Related U.S. Application Data

(63) Continuation of application No. 14/865,898, filed on Sep. 25, 2015, now Pat. No. 10,204,266.

(30) Foreign Application Priority Data

Sep. 25, 2014 (KR) .................. 10-2014-0128502

(51) Int. Cl.
  *G06K 9/00* (2006.01)
(52) U.S. Cl.
  CPC .............. *G06K 9/00604* (2013.01)
(58) Field of Classification Search
  None
  See application file for complete search history.

(56) References Cited

U.S. PATENT DOCUMENTS

| 7,869,626 | B2 | 1/2011 | Ko | |
| 8,111,879 | B2* | 2/2012 | Phinney | G06K 9/00604 |
| | | | | 382/117 |
| 8,457,367 | B1* | 6/2013 | Sipe | G06K 9/00315 |
| | | | | 382/118 |
| 9,228,920 | B2* | 1/2016 | Blonde | G06K 9/0061 |
| 9,256,719 | B2* | 2/2016 | Berini | G06F 21/32 |

(Continued)

FOREIGN PATENT DOCUMENTS

| CN | 103152517 | 6/2013 |
| KR | 1020020028406 | 4/2002 |

(Continued)

OTHER PUBLICATIONS

Wang et al., CN103152517A, machine translation.*

(Continued)

*Primary Examiner* — Mohammad J Rahman
(74) *Attorney, Agent, or Firm* — The Farrell Law Firm, P.C.

(57) ABSTRACT

A method and an apparatus for recognizing an iris is provided. The method includes acquiring an image from an iris recognition camera in response to receiving a request for iris recognition, displaying a preview image including an iris recognition area corresponding to the iris recognition camera acquired from a regular camera in response to detecting an iris in the acquired image and obtaining information for the detected iris from the iris recognition camera and performing iris recognition using the information for the detected iris.

20 Claims, 24 Drawing Sheets

(56) References Cited

U.S. PATENT DOCUMENTS

| | | | |
|---|---|---|---|
| 9,514,364 B2* | 12/2016 | Sheng | G06K 9/46 |
| 9,633,259 B2 | 4/2017 | Lee | |
| 2001/0031072 A1* | 10/2001 | Dobashi | G07C 9/253 |
| | | | 382/118 |
| 2003/0020828 A1* | 1/2003 | Ooi | G06K 9/00597 |
| | | | 348/371 |
| 2003/0093805 A1 | 5/2003 | Gin | |
| 2005/0084137 A1 | 4/2005 | Kim | |
| 2008/0075334 A1 | 3/2008 | Determan | |
| 2008/0292144 A1 | 11/2008 | Kim | |
| 2009/0041309 A1* | 2/2009 | Kim | G06K 9/00604 |
| | | | 382/117 |
| 2009/0278965 A1* | 11/2009 | Ko | H04N 5/2258 |
| | | | 348/262 |
| 2010/0278390 A1* | 11/2010 | Silveira | G02B 27/0025 |
| | | | 382/106 |
| 2010/0299530 A1 | 11/2010 | Bell | |
| 2011/0087611 A1* | 4/2011 | Chetal | G10L 17/00 |
| | | | 705/325 |
| 2011/0243397 A1* | 10/2011 | Watkins | G06F 16/5854 |
| | | | 382/118 |
| 2011/0267435 A1* | 11/2011 | Desjardins | H04N 5/2256 |
| | | | 348/47 |
| 2012/0062720 A1 | 3/2012 | Choi et al. | |
| 2012/0293642 A1* | 11/2012 | Berini | G06F 21/32 |
| | | | 348/77 |
| 2012/0309523 A1* | 12/2012 | Yamashita | A63F 13/213 |
| | | | 463/31 |
| 2013/0051631 A1* | 2/2013 | Hanna | G06K 9/00604 |
| | | | 382/117 |
| 2013/0089240 A1 | 4/2013 | Northcott | |
| 2013/0107214 A1 | 5/2013 | Blixt | |
| 2013/0278800 A1 | 10/2013 | Liu | |
| 2013/0321580 A1* | 12/2013 | Chou | H04N 13/271 |
| | | | 348/46 |
| 2013/0321587 A1* | 12/2013 | Kim | H04N 5/23212 |
| | | | 348/47 |
| 2013/0336545 A1 | 12/2013 | Pritikin | |
| 2015/0312445 A1* | 10/2015 | Cha | H04N 13/373 |
| | | | 348/48 |
| 2015/0347814 A1* | 12/2015 | Sheng | G06K 9/00624 |
| | | | 382/103 |
| 2016/0019421 A1* | 1/2016 | Feng | G06K 9/00604 |
| | | | 382/117 |
| 2016/0086033 A1* | 3/2016 | Molin | B60R 1/00 |
| | | | 345/419 |
| 2016/0134791 A1 | 5/2016 | Prashakar | |

FOREIGN PATENT DOCUMENTS

| | | |
|---|---|---|
| KR | 1020100069028 | 6/2010 |
| KR | 1020130054767 | 5/2013 |
| KR | 101300166 | 8/2013 |
| WO | WO 2007/081122 | 7/2007 |

OTHER PUBLICATIONS

Search_IP.com.*

Machine Translation, Wang et al., CN103152517 (A).

Korean Office Action dated Nov. 26, 2020 issued in counterpart application No. 10-2014-0128502, 14 pages.

* cited by examiner

METHOD AND APPARATUS FOR IRIS RECOGNITION

PRIORITY

This application is a Continuation Application of U.S. patent application Ser. No. 14/865,898, filed on Sep. 25, 2015, now U.S. Pat. No. 10,204,266, issued Feb. 12, 2019, and claims priority under 35 U.S.C. § 119(a) to a Korean Patent Application filed on Sep. 25, 2014, in the Korean Intellectual Property Office and assigned Serial No. 10-2014-0128502, the content of each of which is incorporated herein by reference.

BACKGROUND

1. Field of the Invention

The present invention relates generally to a method and an apparatus for recognizing an iris, and more particularly, to a method and an apparatus for recognizing an iris by using a plurality of cameras.

2. Description of the Related Art

An electronic apparatus may store information related to privacy, such as user location information, notes, financial transactions, etc., as well as data such as contacts, call history, messages, etc. In order to protect such information related to privacy, the electronic apparatus may be provided with various security functions. In particular, a method for maintaining the security of an electronic apparatus by using user biometric information has been widely used. Such a method for maintaining the security of an electronic apparatus by using biometric information may include fingerprint recognition, face recognition, iris recognition, etc.

In particular, iris recognition is an authentication technology for security purposes that uses characteristics of the iris which differ among individual. In addition, iris recognition may be accomplished by using a camera without any direct physical contact. Further, even in the case of wearing glasses or contact lenses, a person may be accurately identified using iris recognition.

However, since infrared rays are utilized when recognizing the iris, an iris recognition camera typically obtains an iris image in black and white. When the obtained iris image in black and white is previewed on a screen, the usability for user recognition may be degraded as the obtained image is different from the actual image of the physical eyes. In addition, when the iris image in black and white is displayed on the screen of an electronic apparatus, the image may be photographed through a screen capture function and may be divulged to other users.

SUMMARY

The present invention has been made to address at least the problems and the disadvantages described above, and to provide at least the advantages described below.

Accordingly, an aspect of the present invention is to provide a method and an apparatus for recognizing an iris, the latter of which is equipped with two cameras to perform iris recognition.

Accordingly, another aspect of the present invention is to provide an electronic apparatus that performs iris recognition using an iris recognition camera, and displays an iris area as a color image identical with the image of a user's eye by using a regular camera, thereby improving usability.

Accordingly, another aspect of the present invention is to provide a method and an apparatus for recognizing an iris which displays an iris recognition area on a screen when detecting a command to request the iris recognition, thereby enhancing a recognition rate of iris.

In accordance with an aspect of the present invention, a method of recognizing an iris in an electronic apparatus is provided. The method includes displaying a preview image by driving a regular camera, displaying an iris recognition area corresponding to an iris recognition camera in the preview image, determining whether an iris image exists in the iris recognition area, and obtaining image information from the iris recognition camera and performing iris recognition, when the iris image exists in the iris recognition area.

In accordance with another aspect of the present invention, a method of recognizing an iris in an electronic apparatus is provided. The method includes displaying a preview image by driving a regular camera, when receiving a command to request iris recognition, obtaining an eye area from the preview image and displaying the obtained eye area as an iris recognition area, determining whether an eye image exists in the iris recognition area, driving an iris recognition camera, when the eye image exists in the iris recognition area, and obtaining image information from the iris recognition camera and performing iris recognition.

In accordance with another aspect of the present invention, an apparatus for recognizing an iris is provided. The apparatus includes an iris recognition camera, which includes an infrared light emitting diode, configured to obtain an iris image, a regular camera configured to display a preview image, and a controller configured to display the preview image by driving the regular camera, display an iris recognition area corresponding to the iris recognition camera in the preview image, determine whether the iris image exists in the iris recognition area, and obtain image information from the iris recognition camera and perform iris recognition when the iris image exists in the iris recognition area.

In accordance with another aspect of the present invention, an electronic apparatus is provided. The electronic apparatus includes an iris recognition camera, which includes an infrared light emitting diode, configured to obtain iris image information, a regular camera configured to display a preview image, and obtain an eye image. and a controller configured to display the preview image by driving the regular camera when receiving a command to request iris recognition, obtain an eye area from the preview image and display the obtained eye area as an iris recognition area, determine whether the eye image exists in the iris recognition area, drive the iris recognition camera when the eye image exists in the iris recognition area, and obtain image information from the iris recognition camera and perform iris recognition.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Meanwhile, it is noted that embodiments of the present invention described in the present specification and claims are given for illustrative purposes only, and those skilled in the art will appreciate that various modifications, additions and substitutions are possible without departing from the scope and spirit of the invention.

An electronic apparatus, according to various embodiments of the invention, may include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., Head-Mounted Display (HMD), such as electronic glasses, electronic clothes, an electronic bracelet, an electronic necklace, an electronic appcessory, an electronic tattoo, or a smartwatch).

In an embodiment of the present invention, an iris recognition area refers to an area having a high accuracy of iris recognition, when a user performs iris recognition. The iris recognition area is displayed on a portion of a touch screen. When a user's iris does not exist in the iris recognition area, the user is guided so that the user's iris is moved to the iris recognition area. The method for guiding the user may include a voice event, a pop-up event, and a text event to indicate a movement in a specific direction.

In addition, the electronic apparatus according to an embodiment of the present invention may display an iris guide in the iris recognition area. The iris guide is a reference which informs a user about a location of the iris in a displayed preview image. The iris guide may be displayed as an emoticon, an icon, a dotted line, etc., so as to differentiate the area of the iris guide from other areas of the iris recognition area (e.g., an area excluding the iris guide). When the electronic apparatus detects that user's iris is located in the iris guide, iris recognition is performed. In addition, the iris guide may be located in the center of an iris camera, but is not limited thereto.

Figure 1:
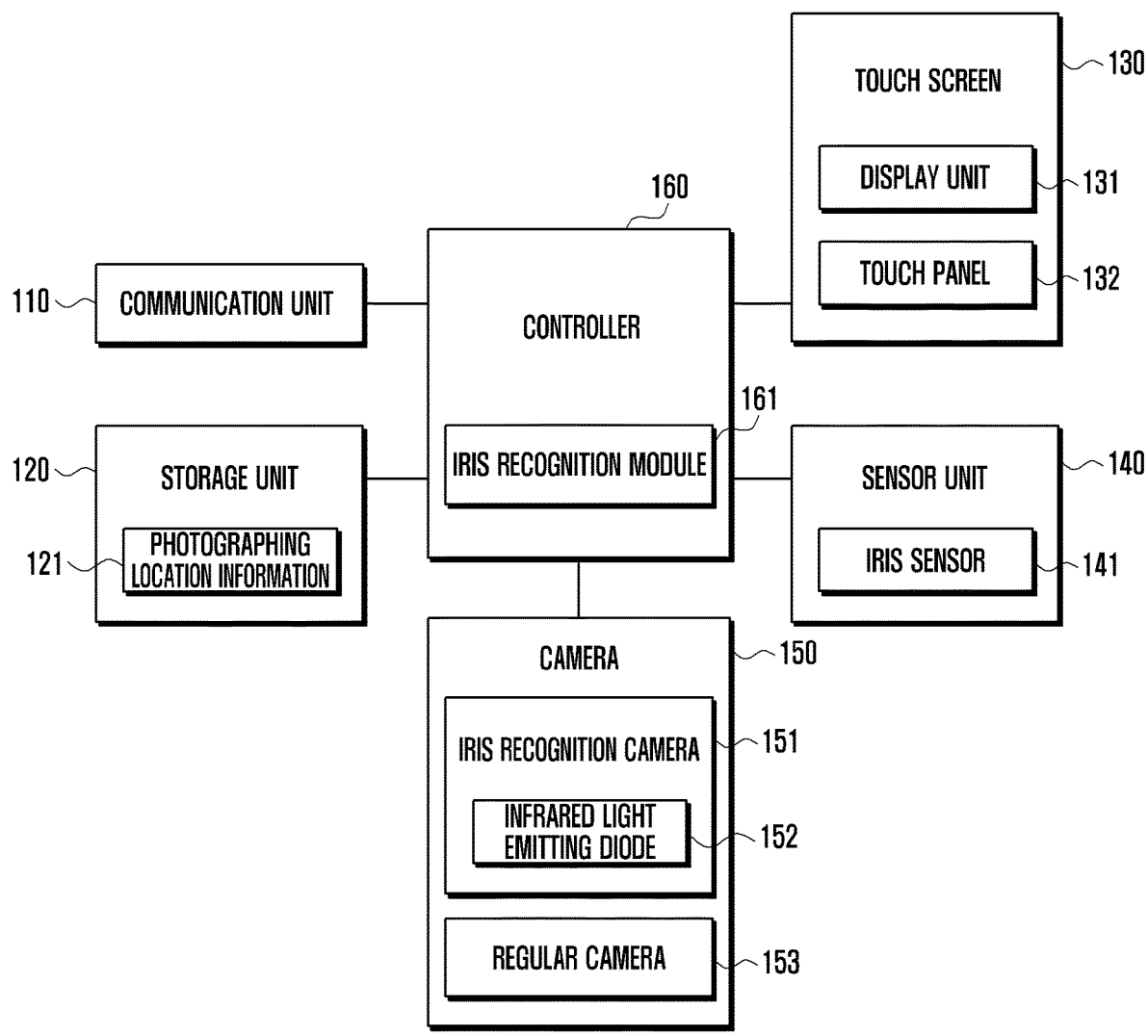
FIG. 1 is a block diagram illustrating a configuration of an electronic apparatus, according to an embodiment of the present invention.

FIG. 1 is a block diagram illustrating a configuration of an electronic apparatus, according to an embodiment of the present invention.

Referring to FIG. 1, the electronic apparatus, according to an embodiment of the present invention, includes a communication unit 110, a storage unit 120, a touch screen 130, a sensor unit 140, a camera 150, and a controller 160.

The communication unit 110 performs a voice call, a video call, or data communication with an external device through a network. The communication unit 110 may include a RF transmitter which up-converts and amplifies a frequency of a transmitted signal and a RF receiver which low-noise amplifies a received signal and down-converts a frequency. In addition, the communication unit 110 may include a modulator and a demodulator. The modulator and the demodulator 110 may include a Code Division Multiple Access (CDMA), a Wideband CDMA (WCDMA), a Long Term Evolution (LTE), a Wi-Fi, a Wireless-Broadband (WI-BRO), a Bluetooth, a Near Field Communication (NFC), etc. The communication unit 110 may be a mobile communication module, an Internet communication module and/or a short range communication module.

The storage unit 120 includes a program memory for storing an operation program of the electronic apparatus and a data memory for storing data generated while a program is performed. In particular, the storage unit 120 stores iris information and face information of user. In addition, the storage unit 120 stores photographing location information 121. The photographing location information 121 is information on an area which is captured through an iris recognition camera 151 in a preview image. The information includes angle information and coordinate information (location information). The touch screen 130 may be configured of an integral type including a display unit 131 and a touch panel 132. The display unit 131 displays various screens in accordance with the use of the electronic apparatus under the control of the controller 160. In addition, the display unit 131 is configured of a Liquid Crystal Display (LCD), an Organic Light Emitted Diode (OLED), an Active Matrix Organic Light Emitted Diode (AMOLED), a Flexible Display, a Bended Display, a 3D Display, etc. In addition, display unit 131 may be configured in a flexible, transparent or wearable type. The touch panel 132 may be a composite touch panel including a hand touch panel for detecting a hand gesture and a pen touch panel for detecting a pen gesture.

In particular, the display unit 131 displays an area corresponding to the photographing location information 121 stored in the storage unit 120 in the preview image under the control of the controller 160. The display unit 131 displays an iris recognition area so that iris recognition is easily performed under the control of the controller 160. In addition, the display unit 131 displays an iris guide in the iris recognition area under the control of the controller 160.

The sensor unit 140 includes an iris sensor 141. The iris sensor 141 scans a user's iris and transmits the scanned image of the user's iris to the controller 160.

The camera 150 performs the function of photographing a subject and outputting to the controller 160. The camera 150 includes a lens which collects light, an image sensor which converts the light collected from the lens to an electrical signal, and an image signal processor which processes the electrical signal inputted from the image sensor as raw data and outputs to the controller 160.

In particular, the camera 150 includes the iris recognition camera 151 and a regular camera 153.

In addition, the iris recognition camera 151 includes an infrared light emitting diode 152. The infrared light emitting diode 152 emits light of a certain frequency. In addition, the infrared light emitting diode 152 emits the light as a continuous wave or synchronizes to an input frame of the image sensor to emit the light as a pulse. The infrared light emitting diode 152 emits light of a specific wavelength range to the iris.

When the iris recognition camera 151 detects a command to request iris recognition under the control of the controller 160, an iris image illuminated by the light emitted from the infrared light emitting diode 152 is obtained. The iris recognition camera 151 obtains the iris image to transmit to the controller 160.

The regular camera 153 controls the image sensor under the control of the controller 160 to display a captured subject as a preview image. The preview image is an image that includes a whole or a part of a user's face. In addition, the regular camera 153 may share at least a part of an angle of view of the iris recognition camera 151.

The controller 160 controls the overall operation of the electronic apparatus and a signal flow between internal configurations of the electronic apparatus, performs a data processing, and controls a power supply to the above-described configurations from a battery.

In particular, the controller 160 includes an iris recognition module 161.

When detecting a command to request recognition of a user's iris, the controller 160 drives the iris recognition camera 151 to determine whether an iris exists. When the iris exists, the controller 160 drives the regular camera 153 to display a preview image. The controller 160 controls the display unit 131 to display the iris recognition area corresponding to the iris recognition camera 151 in the preview image. That is, the controller 160 displays the image area. That is, the iris recognition area, including at least a part of the iris in the preview image. In addition, the controller 160 controls the display unit 131 to display an iris guide which is image-processed so that only a shape of the iris is identified in the iris recognition area. The controller 160 determines whether the iris image exists in the iris recognition area. When the iris image exists in the iris recognition area, the controller 160 obtains iris image information through the iris recognition camera 151. An operation of iris recognition is performed through the iris recognition module 161 based on the obtained iris image information.

Figure 2:
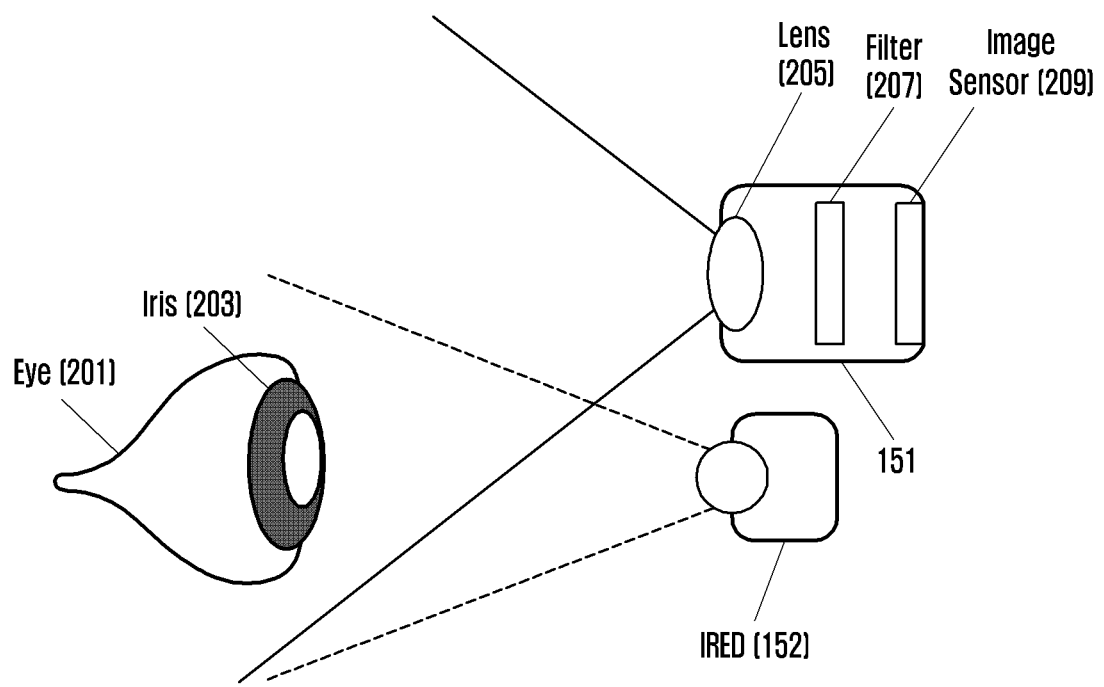
FIG. 2 is a diagram illustrating a configuration of an iris recognition camera, according to an embodiment of the present invention.

FIG. 2 is a diagram illustrating a configuration of an iris recognition camera, according to an embodiment of the present invention.

Referring to FIG. 2, the iris recognition camera 151, according to an embodiment of the present invention, includes a lens 205, a filter 207, and an image sensor 209, and includes an infrared light emitting diode 152 and a light emitting diode (LED) driver on the outside of the iris recognition camera 151.

The infrared light emitting diode 152 emits a light of a specific wavelength band according to the control of the LED driver. The infrared light emitting diode 152 emits a light as a continuous wave or synchronizes to an input frame of the image sensor to emit a light as a pulse. It is assumed that the infrared light emitting diode 152, according to an embodiment of the present invention, synchronizes to an input frame of the image sensor to emit a light as a pulse.

When an infrared light having a wavelength of a specific band is emitted through the infrared light emitting diode 152, the lens 205 receives a light reflected from an eye 201 and an iris 203. The light incident to the lens 205 is transmitted to the filter 207 disposed in a rear side of the lens 205. The filter 207 includes an IR cut filter which transmits only a visible ray area without transmitting an infrared area or a band pass filter which passes a wavelength of a specific band. It is assumed that the filter 207, according to an embodiment of the present invention, is a band pass filter.

The band pass filter may have a wavelength of a specific band emitted through the infrared light emitting diode 152. The band pass filter may pass a wavelength of a specific band from the incident light entered from the lens 205. An infrared signal having the wavelength of a specific band which has passed the band pass filter is transmitted to the image sensor 209.

The image sensor 209 converts the infrared signal which has passed the band pass filter into a digital signal. The converted digital signal is processed by the iris sensor 141 to obtain an iris image.

The iris recognition camera 151, according to various embodiments of the present invention, may only include the lens 205 and the image sensor 209. In this case, the image sensor 209 obtains an iris image by an image sensor of high resolution over a specific resolution.

In the embodiment of FIG. 2, it was illustrated that the iris recognition camera 151 and the infrared light emitting diode 152 are separately provided, but is not limited thereto, and the infrared light emitting diode 152 may be disposed inside of the iris recognition camera 151. It is assumed that the electronic apparatus, according to an embodiment of the present invention, has a structure in which the infrared light emitting diode 152 is disposed inside of the iris recognition camera 151.

Figure 3A:
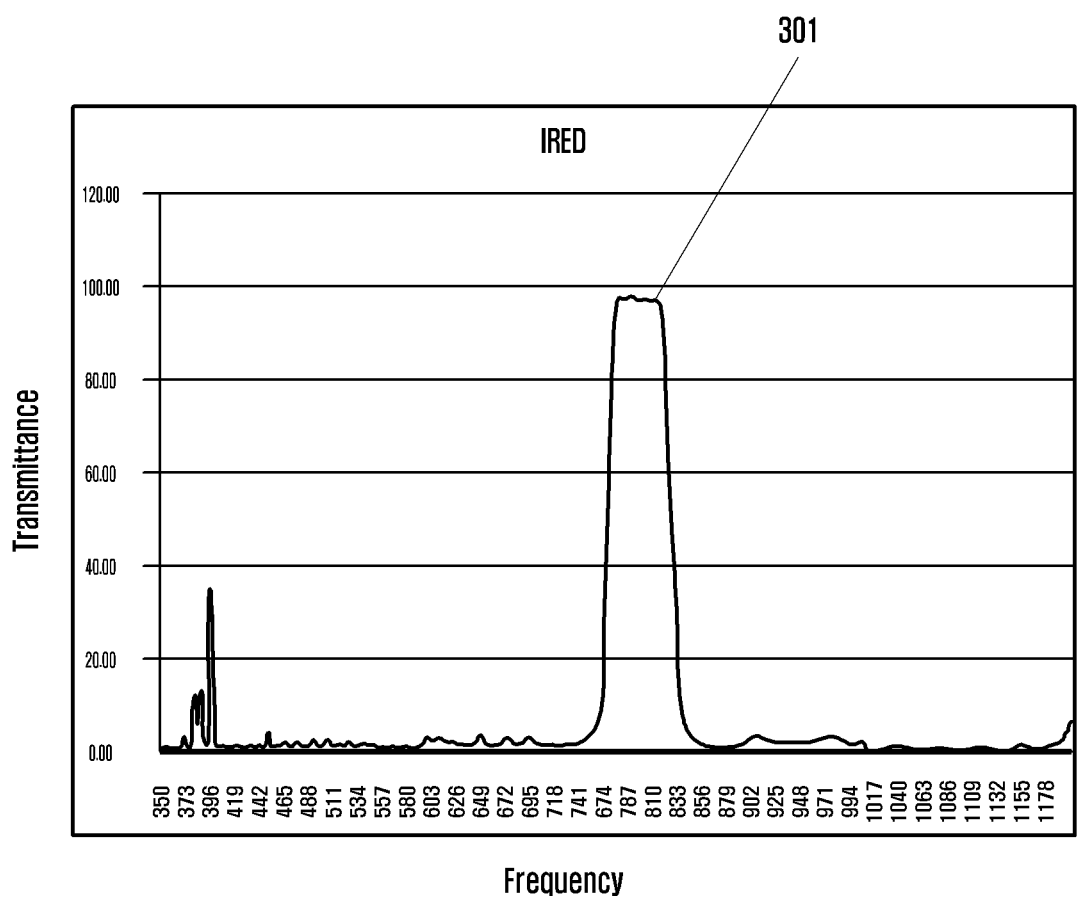
FIGS. 3A and 3B are graphs illustrating an infrared light emitting diode having a specific wavelength band and a signal of band pass filter, according to an embodiment of the present invention.
Figure 3B:
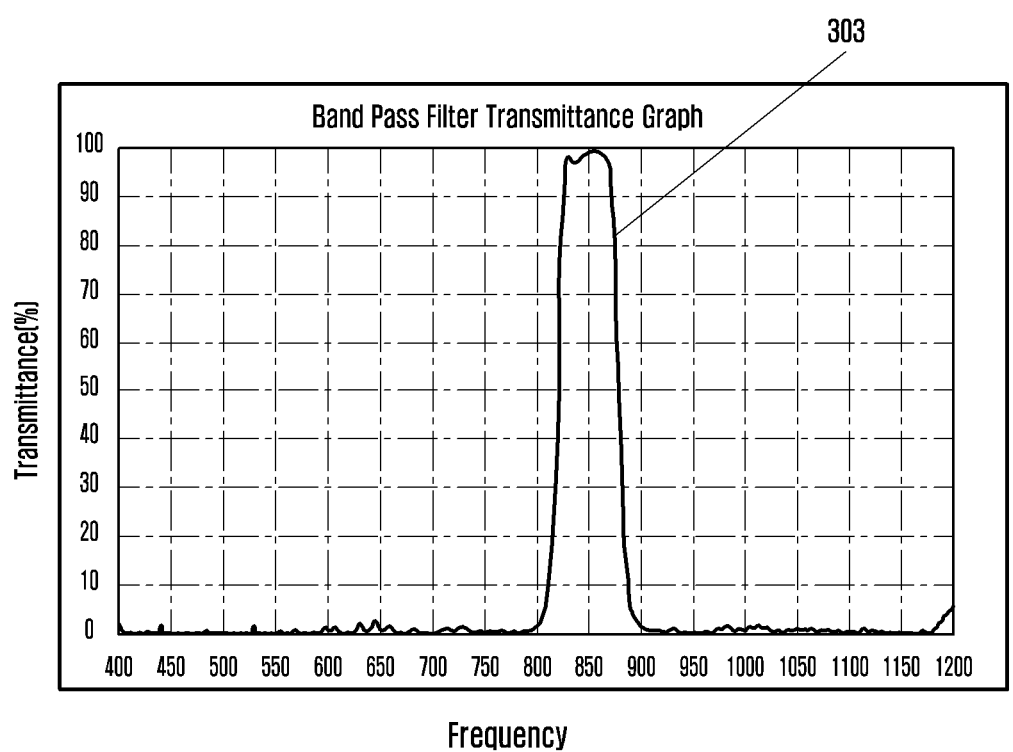

FIGS. 3A and 3B are graphs illustrating an infrared light emitting diode having a specific wavelength band and a signal of band pass filter, according to an embodiment of the present invention.

Referring to FIGS. 3A and 3B, an infrared light of a specific wavelength range is emitted through the infrared light emitting diode 152, and the regular camera 153 receives the reflected light of the emitted infrared light. A band pass filter having a wavelength range which includes at least a portion of the specific wavelength band which is emitted through the infrared light emitting diode 152 is included in the iris recognition camera 151. The band pass filter receives the infrared signal of the specific wavelength range and transmits the received infrared signal to the image sensor 209. The image sensor 209 converts the infrared signal of the specific wavelength range into a digital signal.

For example, as shown in 301 of FIG. 3A, the infrared light emitting diode 152 emits an infrared light having a wavelength range of ±50 nm based on 850 nm. A band pass filter may selectively receive a light of wavelength range 850 nm±50 nm emitted from the infrared light emitting diode 152 as shown in 303 of FIG. 3B. The band pass filter may selectively receive the light of a specific wavelength range 850 nm±50 nm, so that malfunction due to a light of near other infrared wavelength range is prevented.

Figure 4A:
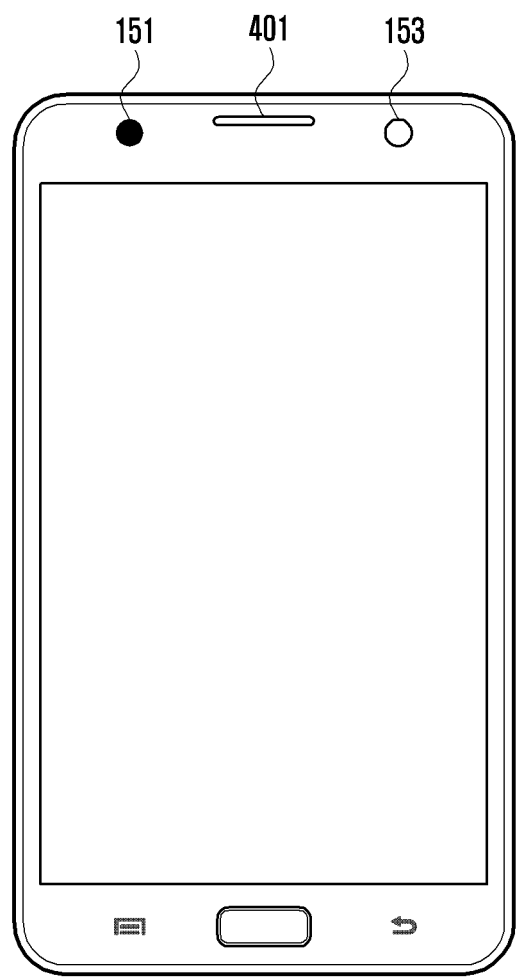
FIGS. 4A to 4C are diagrams illustrating front perspective views of an electronic apparatus, according to an embodiment of the present invention.
Figure 4B:
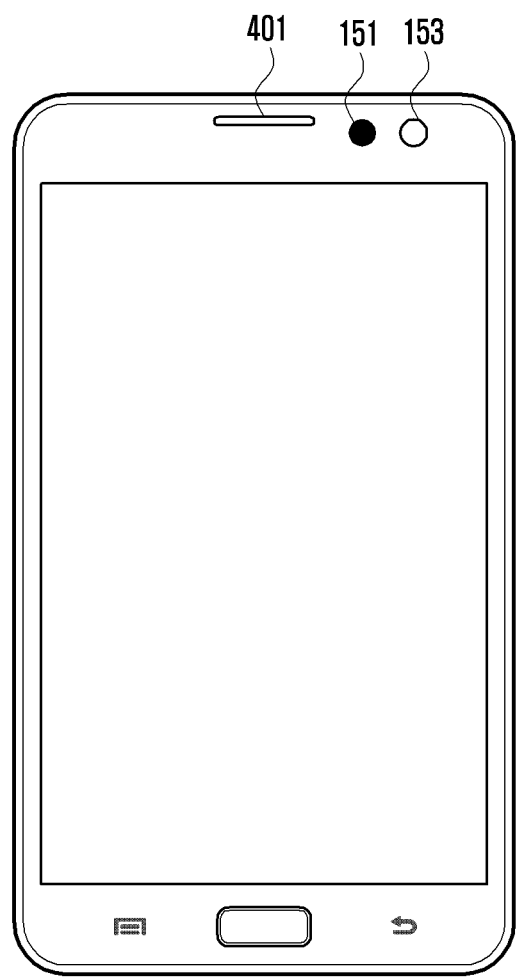
Figure 4C:
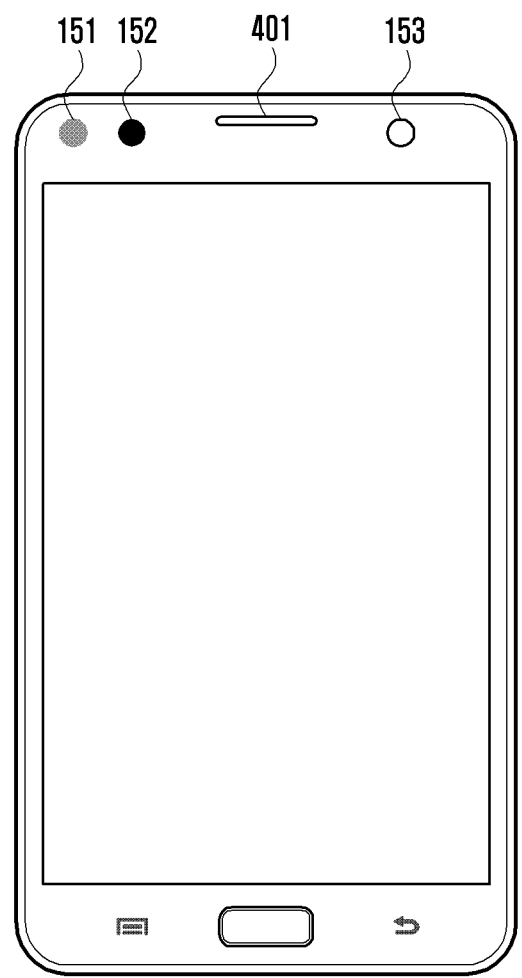

FIGS. 4A to 4C are diagrams illustrating front perspective views of an electronic apparatus, according to an embodiment of the present invention.

Referring to FIG. 4A, the electronic apparatus, according to an embodiment of the present invention, is provided with the iris recognition camera 151 for recognizing an iris and the regular camera 153 for photographing a subject. The iris recognition camera 151 and the regular camera 153 are mounted on opposite sides of a receiver 401 in an upper portion of the electronic apparatus. The iris recognition camera 151 may additionally include an infrared light emitting diode 152. However, the iris recognition camera 151 is not limited thereto and may not include the infrared light emitting diode 152, when the iris recognition camera 151 does not use an infrared light.

Referring to FIG. 4B, the iris recognition camera 151 and the regular camera 153, according to various embodiments of the present invention, are mounted side by side so as to be adjacent to each other in a right area in the upper portion of the electronic apparatus, i.e. to the right of the receiver 401. In addition, the iris recognition camera 151 and the regular camera 153 may be mounted so as to be adjacent to each other in a left area in the upper portion of the electronic apparatus, i.e. to the left of the receiver 401.

Referring to FIG. 4C, the iris recognition camera 151 and the infrared light emitting diode 152, according to various embodiments of the present invention, are mounted so as to be adjacent to each other in the left area based on the receiver 401 in the upper portion of the electronic apparatus to the left in the upper portion of the electronic apparatus, i.e. to the left of the receiver 401. In addition, the regular camera 153 is mounted in the right area in the upper portion of the electronic apparatus, i.e. to the left of the receiver 401.

Hereinafter, as in the case of FIG. 4A, in an embodiment of the present invention, it is assumed that the iris recognition camera 151 and the regular camera 153 are mounted on opposite sides of the receiver 401 in the upper portion of the electronic apparatus. In addition, it is assumed that the iris recognition camera 151 includes the infrared light emitting diode 152.

Figure 5A:
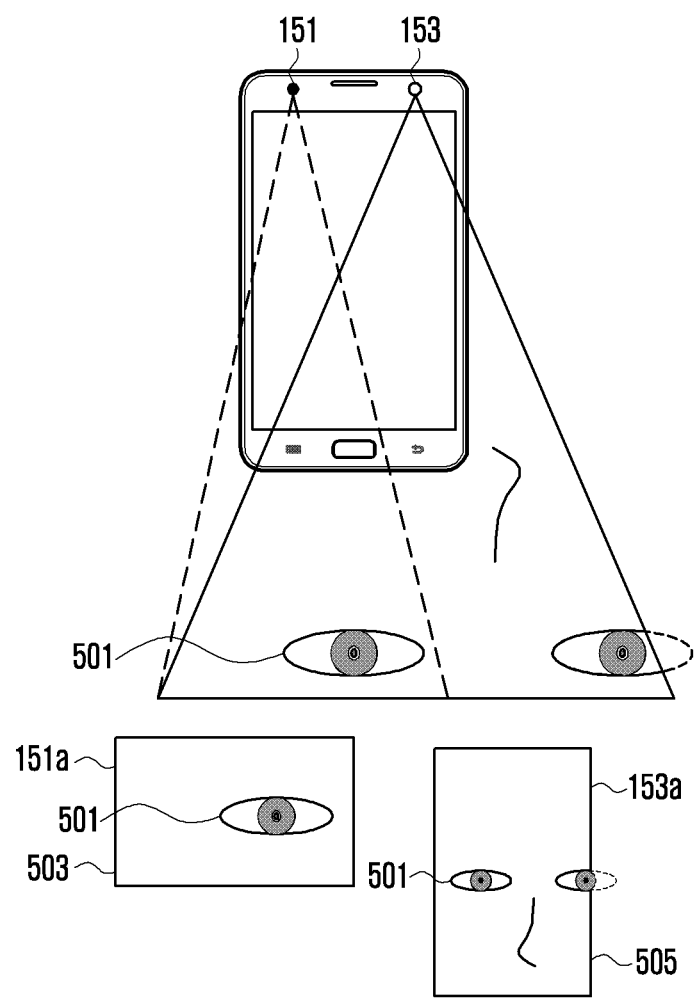
FIGS. 5A and 5B are diagrams illustrating an image captured through an iris recognition camera and a regular camera, according to an embodiment of the present invention.
Figure 5B:
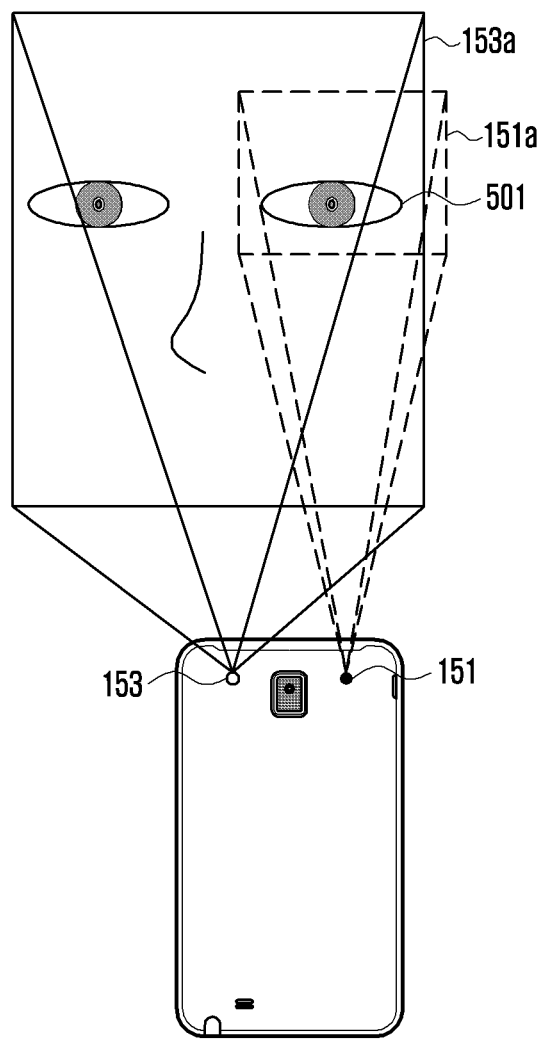

FIGS. 5A and 5B are diagrams illustrating an image captured through an iris recognition camera and a regular camera, according to an embodiment of the present invention.

Referring to FIGS. 5A and 5B, the iris recognition camera 151 and the regular camera 153, according to an embodiment of the present invention, may have a different angle of view. The iris recognition camera 151, according to an embodiment of the present invention, may have a smaller angle of view than the regular camera 153 so as to obtain more information of the iris area. In addition, the angle of view of the iris recognition camera 151 and the regular camera 153 may include the same subject in at least some area. In other words, the regular camera 153 may share at least some area of the angle of view of the iris recognition camera 151. In addition, the iris recognition camera 151 and the regular camera 153 are mounted on opposite sides of the receiver 401 in the upper portion of the electronic apparatus.

As described above, where the iris recognition camera 151 and the regular camera 153 have a different angle of view, the sizes of image obtained by the iris recognition camera 151 and the regular camera 153 are different from each other. Since the locations in which the iris recognition camera 151 and the regular camera 153 are mounted in the electronic apparatus are different from each other, even if the same subject is photographed, the subject will appear at different locations in the image.

In the iris recognition camera 151, the orientation of an image captured by an image sensor is set so as to be horizontal (e.g., a direction in which a long axis of the image is located so as to be horizontal). In the regular camera 153, the orientation of an image captured by an image sensor is set so as to be vertical (e.g., a direction in which a long axis of the image is located so as to be vertical).

For example, when the eye (or the iris) 501 of a user is located in the center of the electronic apparatus, the image of the photographed subject is emitted to the iris recognition camera 151 which is mounted in the left side of the electronic apparatus as shown in 151A, so that the eye 501 of the user is located in the right side in the entered image of the photographed subject as shown in 503.

In addition, when the eye 501 of the user is located in the center of the electronic apparatus, the image of the photographed subject is emitted to the regular camera 153 which is mounted in the right side of the electronic apparatus as shown in 153a, so that the eye 501 of the user is located in the left side in the entered image of the photographed subject as shown in 505.

In various embodiments of the present invention, the iris recognition camera 151 and the regular camera 153 may be mounted to have an image of the same orientation. That is, the orientation of the image which is captured by the iris recognition camera 151 may be set so as to be horizontal (a vertical orientation), and the orientation of the image which is captured by the regular camera 153 may be set so as to be horizontal (a vertical orientation) in the same manner.

Figure 6:
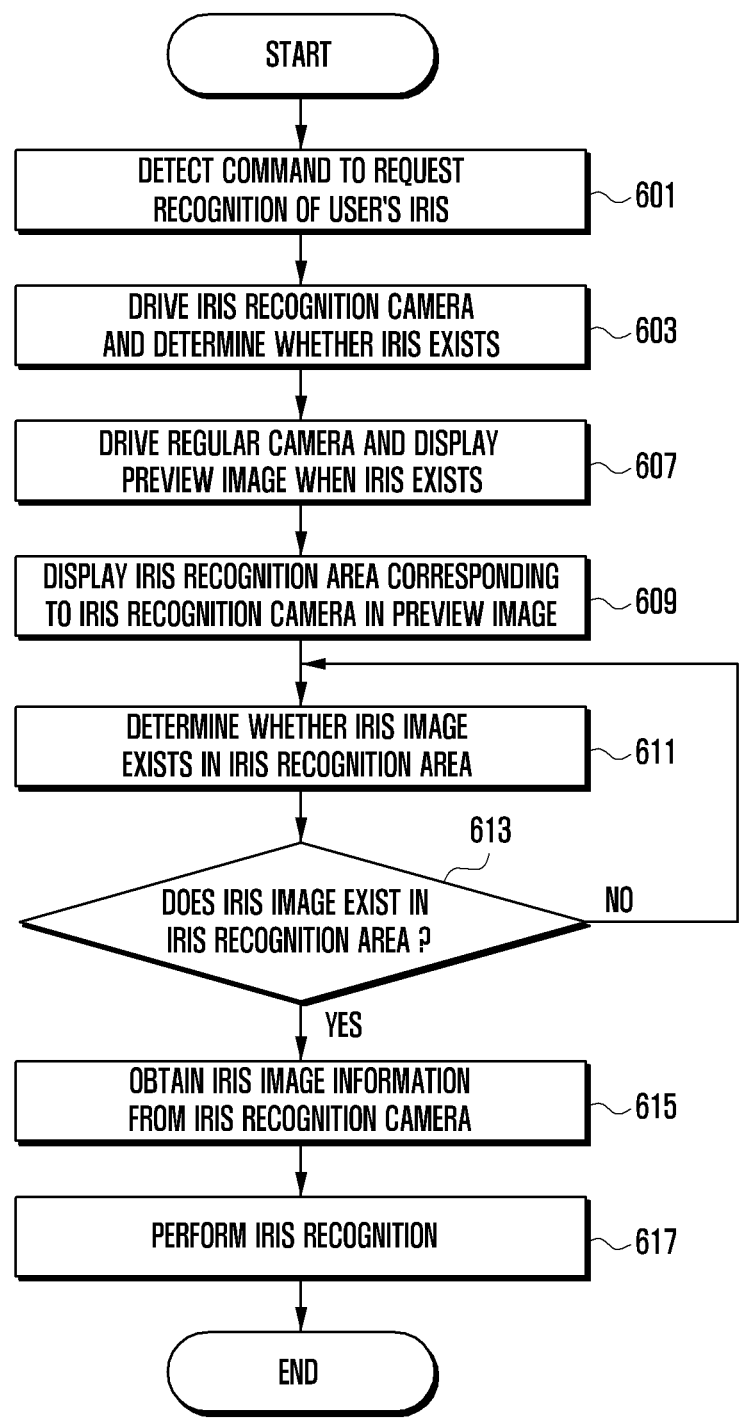
FIG. 6 is a flowchart illustrating a method for recognizing an iris, according to an embodiment of the present invention.

FIG. 6 is a flowchart illustrating a method for recognizing an iris, according to an embodiment of the present invention.

Referring to FIG. 6, the controller 160 detects a command to request the recognition of a user's iris at step 601. For example, when an application (e.g., a bank application) that requires security is executed, if a lock is released in a lock screen or in a locked application, the controller 160 may detect the command to request the recognition of user's iris.

When detecting the command to request the recognition of the user's iris, the controller 160 drives the iris recognition camera 151 to determine whether an iris exists at step 603. When the iris exists, the controller 160 drives the regular camera 153 and controls the display unit 131 to display a preview image at step 607. The displayed preview image may be an image which displays a subject which is captured through the regular camera 153. It is assumed that the preview image, according to an embodiment of the present invention, is an image which includes a whole or a part of a user face area.

The controller 160 displays an iris recognition area corresponding to the iris recognition camera 151 in the preview image at step 609. The controller 160 controls the display unit 131 to separately display the iris recognition area from an area excluding the iris recognition area. For example, the iris recognition area may be displayed with a dotted line so as to be distinguished from the area excluding the iris recognition area.

The controller 160 may display the iris recognition area, which is extracted from the iris recognition camera 151, as a color image through the regular camera 153. As described above, the iris recognition camera 151 emits infrared light through the infrared light emitting diode 152 to obtain an iris image in black and white. When the iris image is displayed as a black-and-white image, the image may be photographed by using a screen capture or the like, and may be leaked to other user. In order to prevent the image from being leaked to other users, the present invention may not display the iris image in black and white through the iris recognition camera 151 but may use the regular camera 153 to preview the area corresponding to the iris recognition camera 151, thereby enhancing security.

In other words, the controller 160 controls the display unit 131 to display the iris area which is captured by the iris recognition camera 151 as a preview image through the regular camera 153. The preview image is an image displaying a whole of a face area including the iris area, or an image displaying a part of a face area including the iris area.

An operation of displaying the iris recognition area corresponding to the iris recognition camera 151 in the preview image at operation 609 is described with reference to FIGS. 7A to 9B.

Figure 7A:
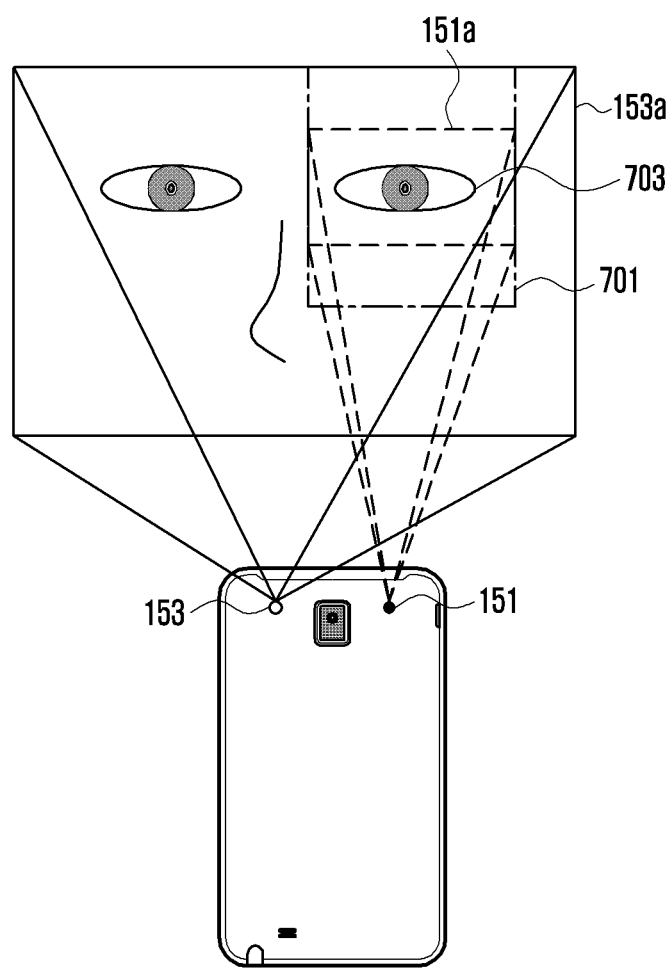
FIGS. 7A and 7B are diagrams illustrating a method for recognizing an iris, according to an embodiment of the present invention.
Figure 7B:
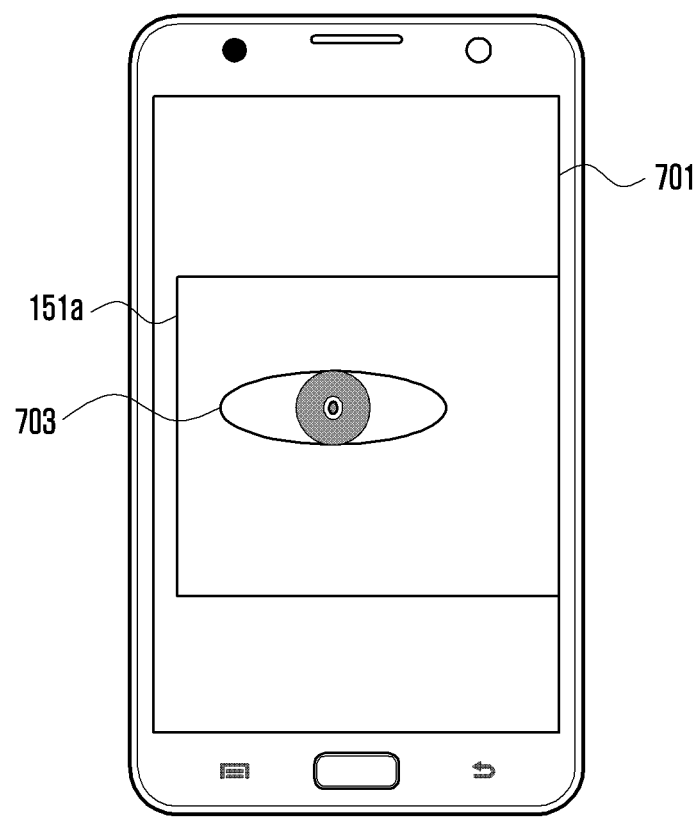

FIGS. 7A and 7B are diagrams illustrating a method for recognizing an iris, according to an embodiment of the present invention.

Referring to FIGS. 7A and 7B, the regular camera 153 may cut out an input image to have the same shape as the preview image of the iris recognition camera 151. The iris recognition camera 151 and the regular camera 153 receive the input image along a horizontal axis. When receiving the input image along the horizontal axis, the controller 160 may cut out the input image according to the area of the touch screen 130 in the horizontal orientation including at least a portion of an angle of view of the iris recognition camera 151 through the regular camera 153. The controller 160 controls the display unit 131 to cut out the input image according to the area of the touch screen 130 so that a preview image is displayed as shown in FIG. 7B.

In the area 151*a*, which is captured through the iris recognition camera 151, the controller 160 cuts out the area 153*a*, which is captured through the regular camera 153, as shown in 701, along the horizontal axis according to the location of the user's eye 703. The location of the user's eye 703, which is captured through the iris recognition camera 151 and the regular camera 153, is identical. The controller 160 controls the display unit 131 to display the iris recognition area in the preview image 153*a* which is captured through the regular camera 153. The user sees the iris recognition area in the preview image and may position the user's eye 703. In addition, as described above, the controller 160 displays the iris area photographed in black and white by the iris recognition camera 151 as a color image through the regular camera 153.

In various embodiments of the present invention, the regular camera 153 may cut out the input image to have a different shape from the preview image of the iris recognition camera 151. The iris recognition camera 151 and the regular camera 153 may receive the input image along a horizontal axis. The controller 160 may cut out the input image according to the area of the touch screen 130 along the vertical axis including at least a portion of an angle of view of the iris recognition camera 151 through the regular camera 153. The controller 160 controls the display unit 131 to display the preview image which is cut according to the area of the touch screen 130.

Figure 8:
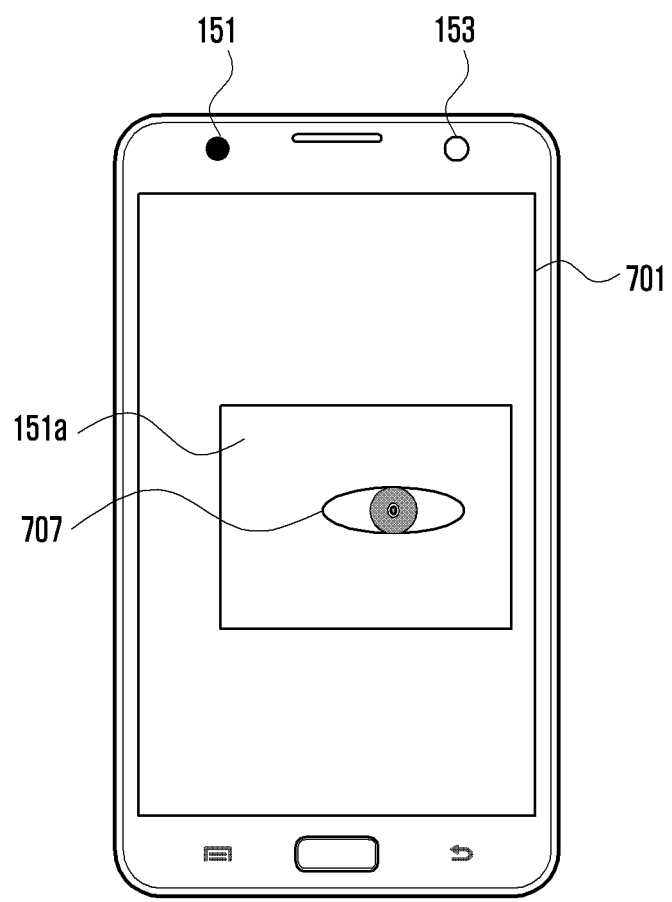
FIG. 8 is a diagram illustrating a method for recognizing an iris, according to an embodiment of the present invention.

FIG. 8 is a diagram illustrating a method for recognizing an iris, according to an embodiment of the present invention.

Referring to FIG. 8, in various embodiments of the present invention, the controller 160 displays an iris guide in the iris recognition area 151*a*. The iris guide 707 informs a user about the location of the iris. The controller 160 displays the iris guide 707 which is image processed such that only the shape of the iris is identified. In addition, the iris guide 707 may be displayed as an emoticon, an icon, a dotted line, etc., to differentiate the area of the iris guide 707 from other areas of the iris recognition area 151*a* (e.g., the area excluding the iris guide 707). When the user's iris is positioned in the iris guide 707, the controller 160 performs the iris recognition immediately.

Figure 9A:
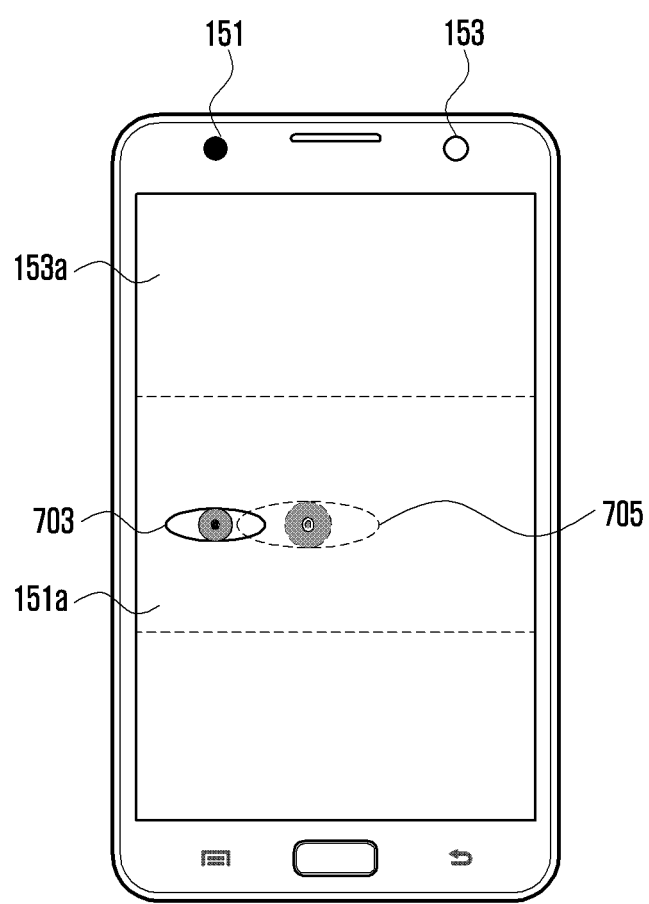
FIGS. 9A and 9B are diagrams illustrating a method for recognizing an iris, according to an embodiment of the present invention.
Figure 9B:
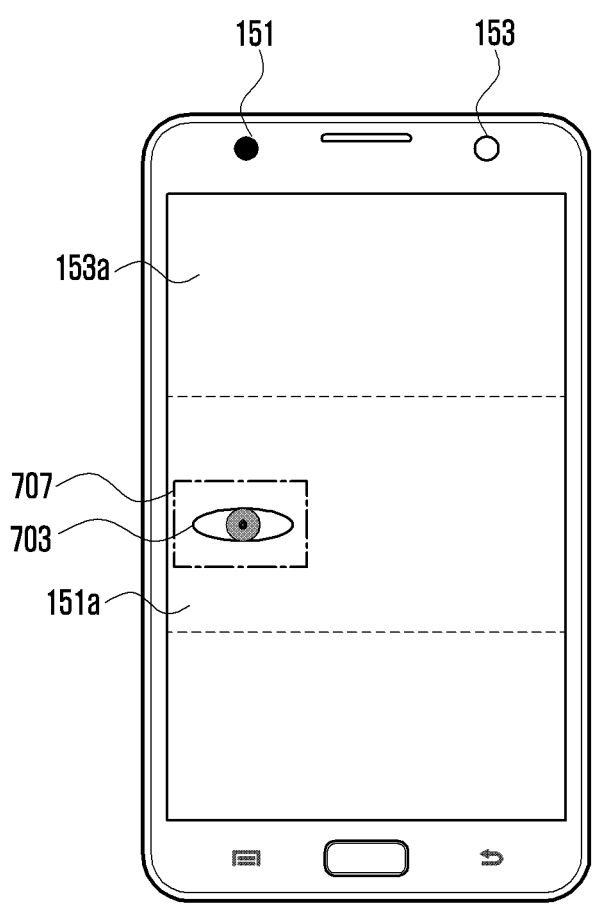

FIGS. 9A and 9B are diagrams illustrating a method for recognizing an iris, according to an embodiment of the present invention.

Referring to FIGS. 9A and 9B, it is assumed that the iris guide 707, according to an embodiment of the present invention, is displayed in a preset location. The preset location may be a center area of the iris recognition camera 151, because the iris may be recognized quickly and accurately when the iris is located in the center of the iris recognition camera 151.

Referring to FIG. 9A, the controller 160 guides a user so that the user's iris 705 input to the iris recognition camera 151 is located in the iris guide 707 displayed in the central area of the iris recognition camera 151. When the iris guide 707 is located in the center of the iris recognition camera 151, the location of the iris input to the iris recognition camera 151 is different from the location of the iris input to the regular camera 153. Since the location of the iris input to the regular camera 153 is different from the location of the iris input to the iris recognition camera 151 by a distance corresponding to a distance between the two cameras, the iris image is obtained at an optimal location only when the user's eye 703 is moved.

Referring to FIG. 9B, the iris guide 707 may be distinguished by the dotted line so that the user's eye 703, which is inputted to the regular camera 153, is positioned in a specific area of the left side in the preview image 153*a*.

Returning to the description of FIG. 6, the controller 160 determines whether the iris image exists in the iris recognition area at step 611, and may decide whether the iris image exists in the iris recognition area at step 613. When the iris image exists in the iris recognition area, the controller 160 obtains iris image information from the iris recognition camera at step 615. The controller 160 performs the iris recognition based on the obtained iris image information at step 617.

On the other hand, when the iris image does not exist in the iris recognition area, the controller 160 returns to step 611 and determines again whether the iris image exists in the iris recognition area. In this case, since the iris image does not exist in the iris recognition area, the controller 160 may decide whether the iris image exists in the iris recognition area as the user moves to obtain the iris location again. The controller 160 may repeat the step 611 and the step 613 until the iris recognition is accomplished. However, it is not limited thereto. When the iris image does not exist in the iris recognition area after performing a certain number of iterations, the controller 160 may terminate the iris recognition step.

In an embodiment of the present invention, when the iris image does not exist in the iris recognition area at step 613, the controller 160 may provide a guide which guides the iris image so as to be positioned in the iris recognition area. The guide indicates a direction to the user in order that the iris image of the user is positioned in the iris recognition area. In an embodiment of the present invention, the controller 160 may provide a voice event for instructing the movement of the iris image to the iris recognition area, and an event for displaying a pop-up window or a text to instruct the movement to the iris recognition area on the display unit 131.

For example, when the iris image of the user is located in the right side of the iris recognition area, the controller 160 may provide a voice event "please move to the left" or an event for displaying a pop-up window or a text on the display unit 131 so as to move the iris image of the user to the iris recognition area located in the left side in comparison with the location of the user's iris. The user may position the iris image in the iris recognition area through the event.

Step 603 of determining whether the iris exists is an operation of obtaining a part of the user face area including the iris; that is, obtaining a wide area. In addition, the step 615 of obtaining image information is an operation of obtaining a rather narrow area (e.g. only the iris) in comparison with the step of determining whether the iris exists.

The electronic apparatus, according to an embodiment of the present invention, may perform the step of obtaining the iris area in an unsecured environment and the step of obtaining the iris image, in a secure environment.

That is, since it is difficult to restrict an operation of malicious software in an unsecured environment, it may involve some risk to perform a biometric operation, such as iris recognition fingerprint recognition, etc. which requires a high level security.

In a secure environment only a received command is executed to protect initially input bio-data and corresponding information from a malicious purpose. Accordingly, performing a biometric operation, such as the iris recognition, should be performed in a secure environment to prevent security problems due to malicious software.

Accordingly, in an embodiment of the present invention, obtaining a wide area, that is determining whether the iris exists, may be performed in an unsecure environment. While obtaining the image information and performing the iris recognition are performed in a secure environment.

Figure 10:
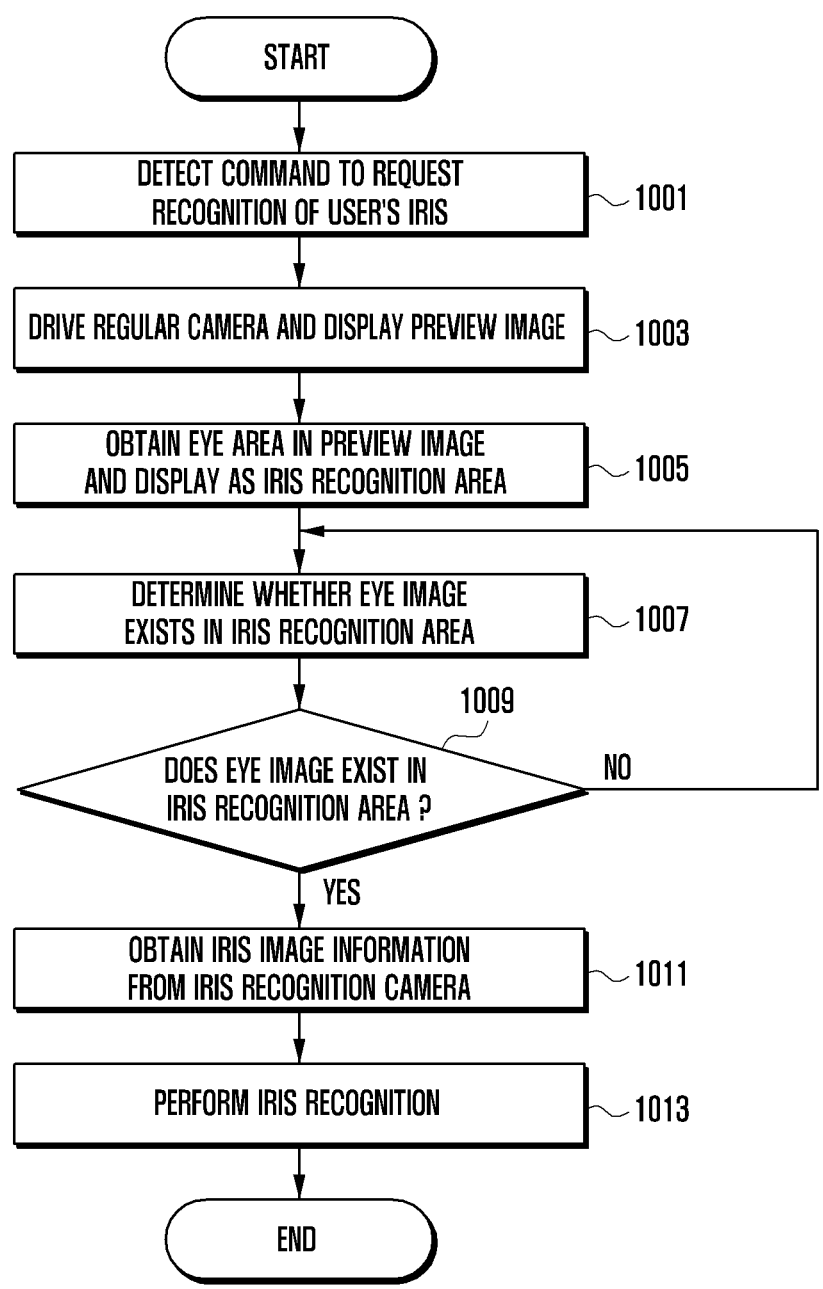
FIG. 10 is a flowchart illustrating a method for recognizing an iris, according to an embodiment of the present invention.

FIG. 10 is a flowchart illustrating a method for recognizing an iris, according to an embodiment of the present invention.

Referring to FIG. 10, a flowchart illustrating a method that drives the regular camera 153 and obtains an eye area while displaying the preview image, and performs the iris recognition by driving the iris recognition camera 151 when the eye exists in the eye area is provided.

Referring to FIG. 10, the controller 160 detects a command to request the recognition of a user's iris at step 1001.

The controller 160 drives the regular camera 153 and controls the display unit 131 to display a preview image of the subject which is captured by the regular camera 153 at step 1003. The controller 160 controls the display unit 131 to obtain an eye area in the preview image and display the eye area as an iris recognition area at step 1005. The controller 160 determines whether an eye image exists in the iris recognition area at step 1007, and decides whether the eye image exists in the iris recognition area at step 1009. When the eye image exists in the iris recognition area, the controller 160 drives the iris recognition camera 151 to obtain iris image information at step 1011. The controller 160 performs iris recognition by using the iris image information at step 1013.

On the other hand, when the eye image does not exist in the iris recognition area at step 1009, the controller 160 returns to step 1007, and determines again whether the eye image exists in the iris recognition area. In this case, since the eye image does not exist in the iris recognition area, the controller 160 attempts to obtain the eye image again as the user moves, and determines and decides whether the eye image exists in the iris recognition area. The step 1007 and the step 1009 may be repeated until the eye image exists in the iris recognition area. However, it is not limited thereto. When the eye image does not exist in the iris recognition area after performing a certain number of iterations, the controller 160 may terminate the iris recognition operation.

Figure 11:
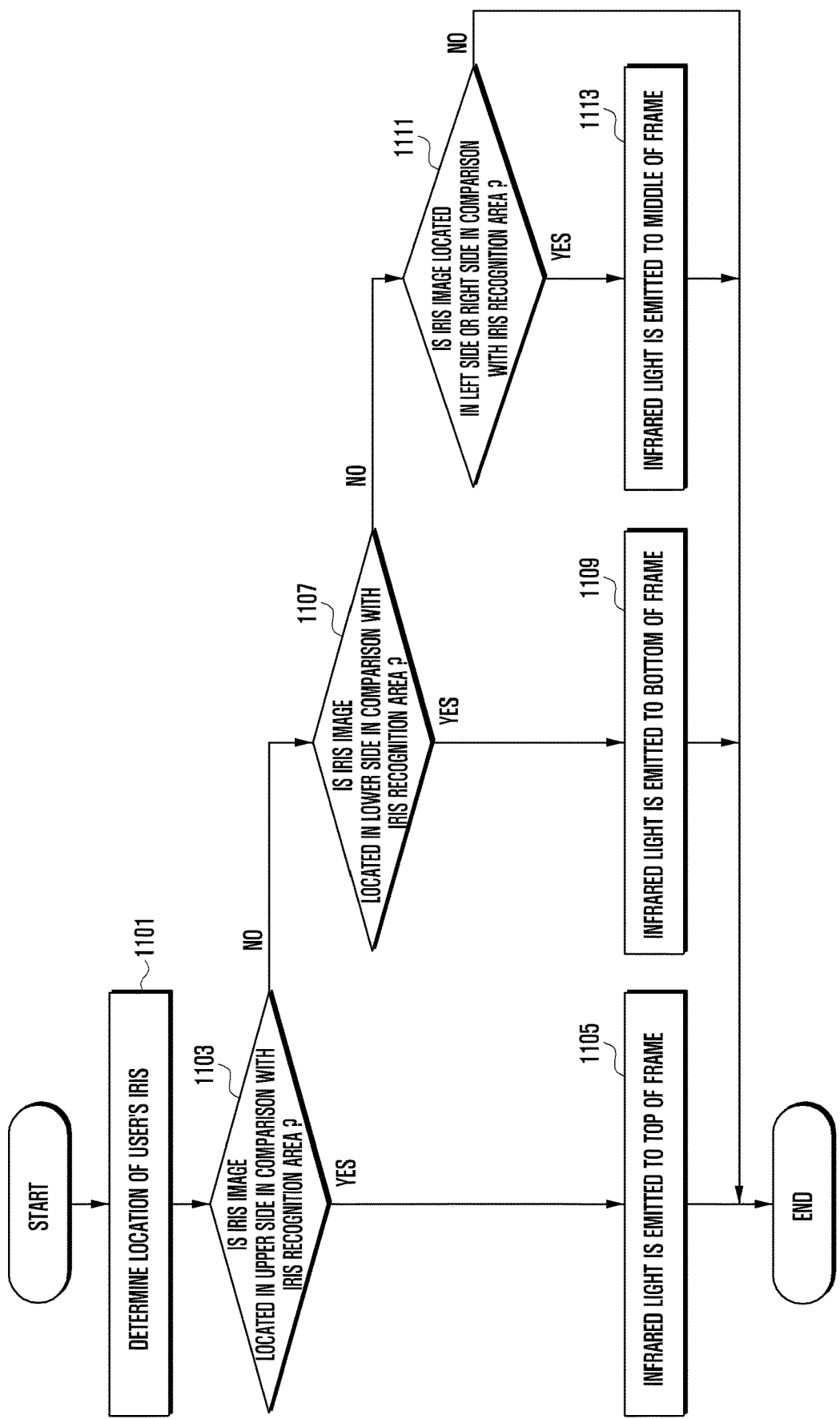
FIG. 11 is a flowchart illustrating a method for controlling an infrared light emitting diode depending on an iris location, according to an embodiment of the present invention.

FIG. 11 is a flowchart illustrating a method for controlling an infrared light emitting diode depending on an iris location, according to an embodiment of the present invention.

Referring to FIG. 11, a flowchart illustrating a method for displaying a preview image according to a rolling shutter and controlling an infrared light emitting diode 152 is provided. The rolling shutter refers to a method of scanning an image which is displayed on the display unit 131 line by line from top to bottom. The controller 160 adjusts the timing of a pulse of the infrared light emitting diode 152 and adjusts the location where the infrared light emitting diode 152 shines most brightly.

The operation of controlling the infrared light emitting diode 152 depending on the iris location of FIG. 11 may be performed after obtaining the iris location at step 611 of FIG. 6 or may be performed when the iris exists in the iris recognition area at step 613. Further, the operation of controlling the infrared light emitting diode 152 depending on the iris location of FIG. 11 may be performed after obtaining the eye location at step 1007 of FIG. 10 or may be performed when the eye exists in the iris recognition area at step 1009.

According to an embodiment of the present invention, an image sensor includes a plurality of lines. The plurality of lines includes a plurality of pixels. The plurality of lines included in the image sensor obtains image information sequentially, based on a driving signal (e.g., a vertical synchronization signal) of the image sensor. For example, in the plurality of lines included in the image sensor, exposure occurs sequentially in order to obtain information on an output image. When each pixel included in the image sensor is exposed sequentially, a difference of time occurs by line readout time between the exposure of the first pixel of a current line and the exposure of the first pixel of the next line. The line readout time refers to a time to store the image information (e.g., the output image information corresponding to each line) on subject obtained by each of the plurality of lines. The readout time may be variously implemented depending on the characteristic of a designer or an electronic apparatus.

When the length of the infrared light emitting diode 152 is shorter than the length from a start time of the exposure of the first pixel of the first line of the rolling shutter to the exposure time of the last pixel of the last line, the brightness of an upper line input to the iris recognition camera 151 is different from the brightness of a lower line.

For example, when the infrared light emitting diode 152 emits light to the top of the rolling shutter, the first line receives the largest amount of the infrared light and the time of receiving the infrared light is decreased toward the next lines. That is, the controller 160 outputs the brightest image in the upper line of the image input to the iris recognition camera 151.

As another example, when the infrared light emitting diode 152 emits light to the middle of the rolling shutter, the middle line receives the largest amount of the infrared light and the time of receiving the infrared light is decreased toward the previous lines and the next lines. That is, the controller 160 outputs the brightest image in the middle line of the image input to the iris recognition camera 151.

As another example, when the infrared light emitting diode 152 emits light to the bottom of the rolling shutter, the first line receives the least amount of the infrared light and the time of receiving the infrared light is increased toward the next lines. That is, the controller 160 outputs the brightest image in the lower line of the image input to the iris recognition camera 151.

The controller 160 determines the location of a user's iris at step 1101. The controller 160 determines the user's iris position, and controls the infrared light emitting diode 152 to adjust the timing and/or the amount of the infrared light emission according to the location of the user's iris.

As described above, in an embodiment of the present invention, the angle of view of the regular camera 153 may be relatively larger than the angle of view of the iris recognition camera 151. In this case, although the iris is located in the outside of the angle of view of the iris recognition camera 151, it may exist within the angle of view of the regular camera 153. The controller 160 controls the infrared light emitting diode 152 so that the timing of infrared light emission is adjusted to emit light according to the location of the iris (e.g., upper, lower, left or right side based on the iris recognition area) based on the iris recognition area. The controller 160 controls the infrared light emitting diode 152 to adjust the timing of the light emission to emit light, such that iris recognition is performed rapidly.

The controller 160 decides whether the iris image is located in the upper side of an angle of view of the regular camera 153 in comparison with the iris recognition area at step 1103.

When the iris image is located in the upper side of the angle of view of the regular camera 153 in comparison with the iris recognition area, then in step 1105, the controller 160 controls the infrared light emitting diode 152 so that infrared light is emitted to the top of the frame.

FIGS. 12A to 12D are diagrams illustrating methods for controlling an infrared light emitting diode depending on are iris location, according to an embodiment of the present invention.

Figure 12A:
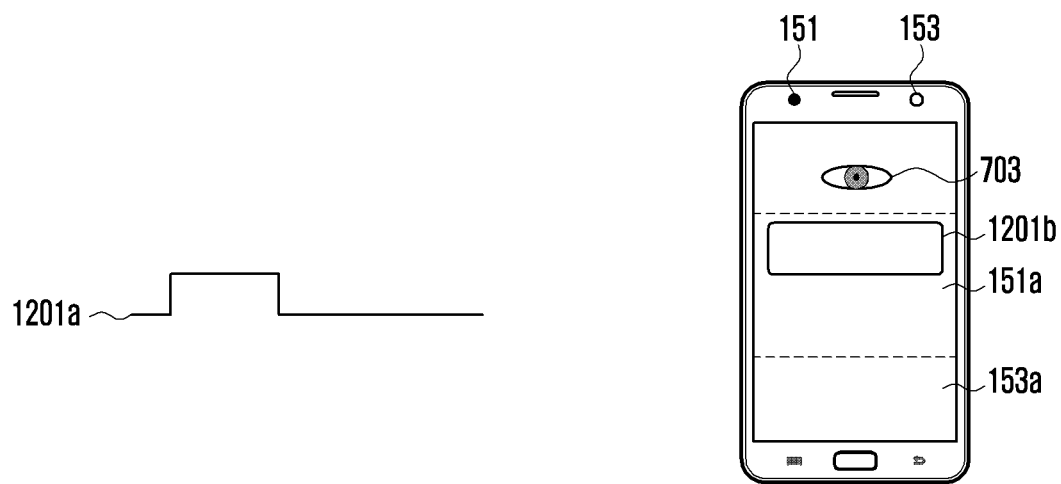
FIGS. 12A to 12D are diagrams illustrating methods for controlling an infrared light emitting diode depending on are iris location, according to an embodiment of the present invention.

Referring to FIG. 12A, when the iris image of the user's eye 703 is located in the upper side of the angle of view of the regular camera 153 in comparison with the iris recognition area 151a, the controller 160 controls the infrared light emitting diode 152 so that infrared light is emitted to the top of frame as shown in 120 lb. The controller 160 controls a pulse of the infrared light emitting diode 152, as shown in 1201a, so as to be emitted to the top of frame so that the largest amount of infrared light is emitted to the upper line of the frame, as shown in 120 lb. The controller 160 guides to move the iris image in a downward direction, and performs iris recognition when the iris image is located within the line 1201b.

Referring back to FIG. 11, when the iris image is not located in the upper side of the angle of view of the regular camera 153 in comparison with the iris recognition area, the controller 160 decides whether the iris image is located in the lower side of an angle of view of the regular camera 153 in comparison with the iris recognition area, at step 1107.

When the iris image is located in the lower side of the angle of view of the regular camera 153 in comparison with the iris recognition area, then in step 1109, the controller 160 controls the infrared light emitting diode 152 so that infrared light is emitted to the bottom of the frame.

Figure 12B:
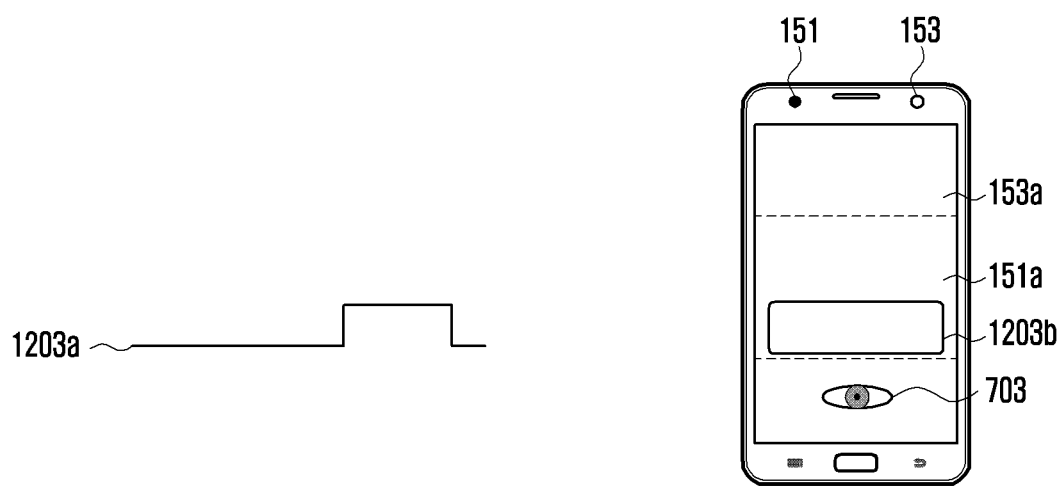

Referring to FIG. 12B, when the iris image of the user's eye 703 is located in the lower side of the angle of view of the regular camera 153 based on the iris recognition area 151a, the controller 160 controls the infrared light emitting diode 152 so that infrared light is emitted to the bottom of frame, as shown in 1203b. The controller 160 controls a pulse of the infrared light emitting diode 152, as shown in 1203a, so as to be emitted to the bottom of the frame so that the largest amount of infrared light is emitted to the bottom (lower) line of the frame, as shown in 1203b. The controller 160 guides to move the iris image in an upward direction, and performs iris recognition when the iris image is located within the line 1203b.

Referring back to FIG. 11, when the iris image is not located in the lower side of the angle of view of the regular camera 153 in comparison with the iris recognition area, the controller 160 decides whether the iris image is located in the left side or the right side of the angle of view of the regular camera 153 in comparison with the iris recognition area, at step 1111.

When the iris image is located in the left or the right side of the angle of view of the regular camera 153 in comparison with the iris recognition area, then in step 1113, the controller 160 controls the infrared light emitting diode 152 so that infrared light is emitted to the middle of the frame.

Figure 12C:
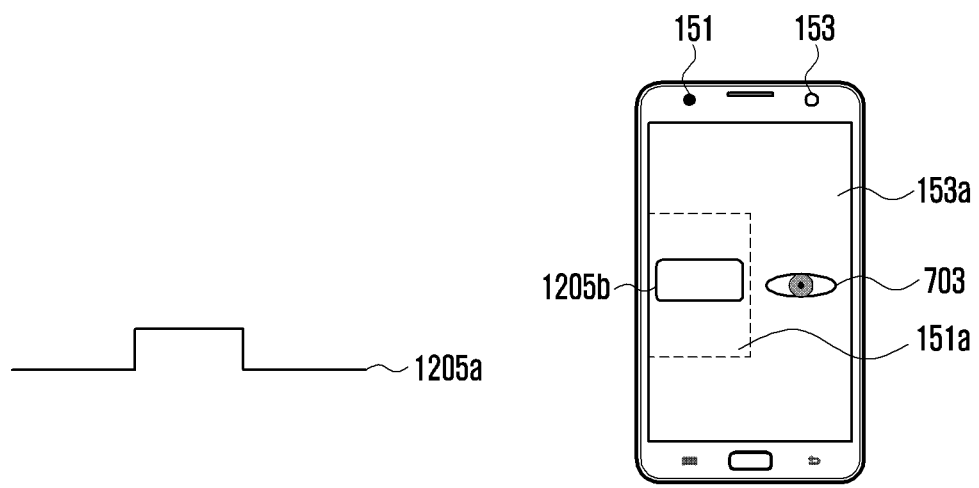
Figure 12D:
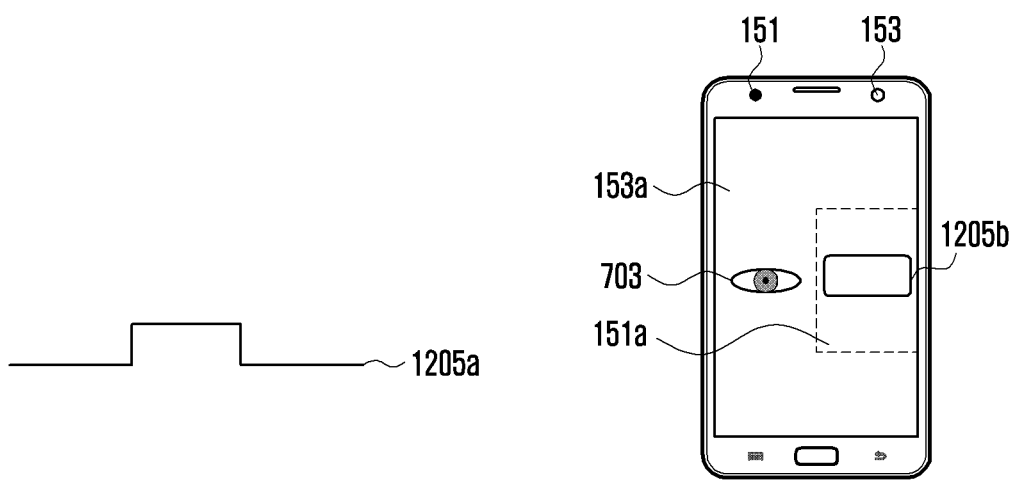

Referring to FIGS. 12C and 12D, when the iris image of the user's eye 703 is located in the right side or left side based on the iris recognition area 151a, the controller 160 controls the infrared light emitting diode 152 so that infrared light is emitted to the middle of frame, as shown in 1205b. The controller 160 controls a pulse of the infrared light emitting diode 152, as shown in 1205a, so as to be emitted to the middle of the frame so that the largest amount of infrared light is emitted to the middle line of the frame, as shown in 1205b. When the iris image is located in the right side of the angle of view of the regular camera 153 based on the iris recognition area, as shown in FIG. 12C, the controller 160 guides to move the iris image in a left direction, and performs iris recognition when the iris image is located within the line 1205b. Alternatively, when the iris image is located in the left side of the angle of view of the regular camera 153 based on the iris recognition area, as shown in FIG. 12D, the controller 160 guides to move the iris image in a right direction, and performs iris recognition when the iris image is located within the line 1205b.

Referring back to FIG. 11, when the iris image is not located in the left side or the right side of the angle of view of the regular camera 153 based on the iris recognition area, the controller 160 terminates the iris recognition operation. In an embodiment of the present invention, when the iris image is not located in the upper, lower, left or right side of the angle of view of the regular camera 153 based on the iris recognition area, the controller 160 does not perform the operation of controlling the infrared light emitting diode 152. Alternatively, when the iris image is located within the iris recognition area, the controller 160 performs the operation of controlling the infrared light emitting diode 152.

In another embodiment of the present invention, the amount of light emitted by the infrared light emitting diode 152 of the electronic apparatus may be adjusted. For example, when the iris image of a user is not located within the angle of view of the regular camera 153, the controller 160 does not drive the infrared light emitting diode 152 or the iris recognition camera 151. In addition, when the iris image of the user is located within the angle of view of the regular camera 153, and is located outside of the angle of view of the iris recognition camera 151, the controller 160 controls the infrared light emitting diode 152 so that the amount of light emission is less than the amount of light emission of the infrared light emitting diode 152 which is used for the actual iris recognition. In this case, the iris recognition camera 151 is in a stand-by state. When the controller 160 detects that the iris image of the user is located in the iris recognition area, the controller 160 drives the iris recognition camera 151 in the stand-by state and performs iris recognition immediately. Accordingly, it is possible to reduce the current consumption used for the light emission of the infrared light emitting diode 152 and the driving of the iris recognition camera 151.

In another embodiment of the present invention, when the iris image of a user is located within the angle of view of the regular camera 153, and is located within the angle of view of the iris recognition camera 151, the controller 160 drives the iris recognition camera 151, and controls a pulse of the infrared light emitting diode 152 so as to be emitted and perform iris recognition.

Figure 13:
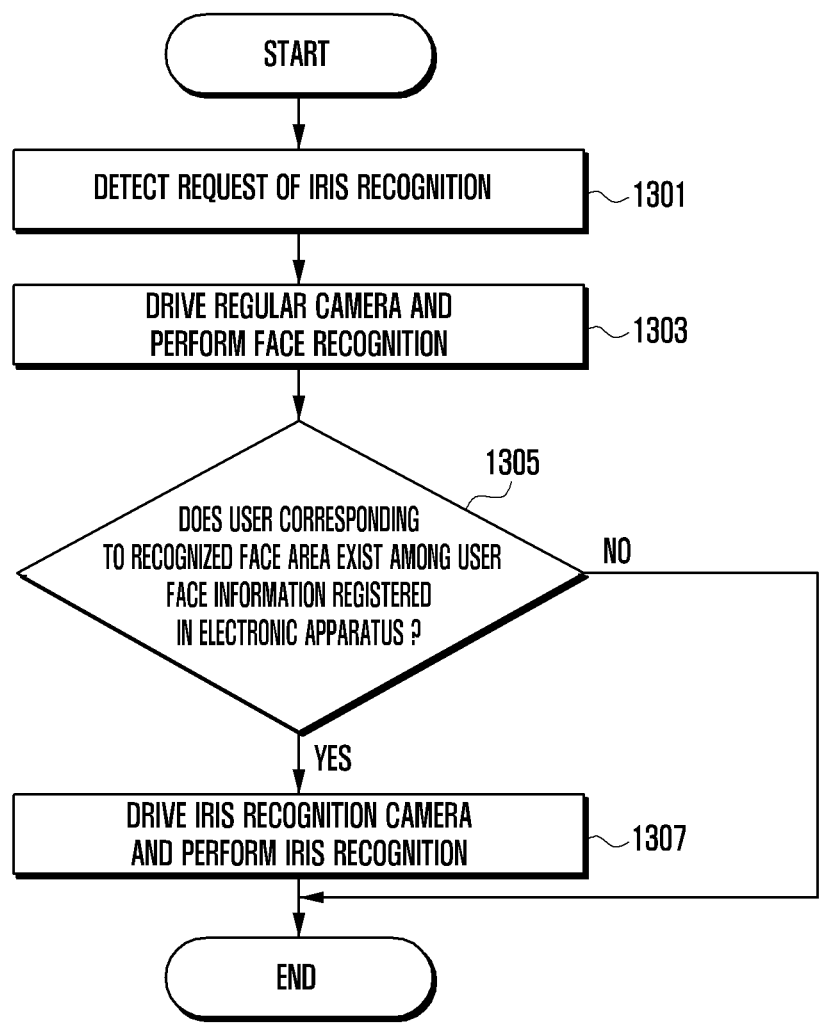
FIG. 13 is a flowchart illustrating a method for recognizing an iris, according to an embodiment of the present invention.

FIG. 13 is a flowchart illustrating a method for recognizing an iris, according to an embodiment of the present invention.

Figure 14A:
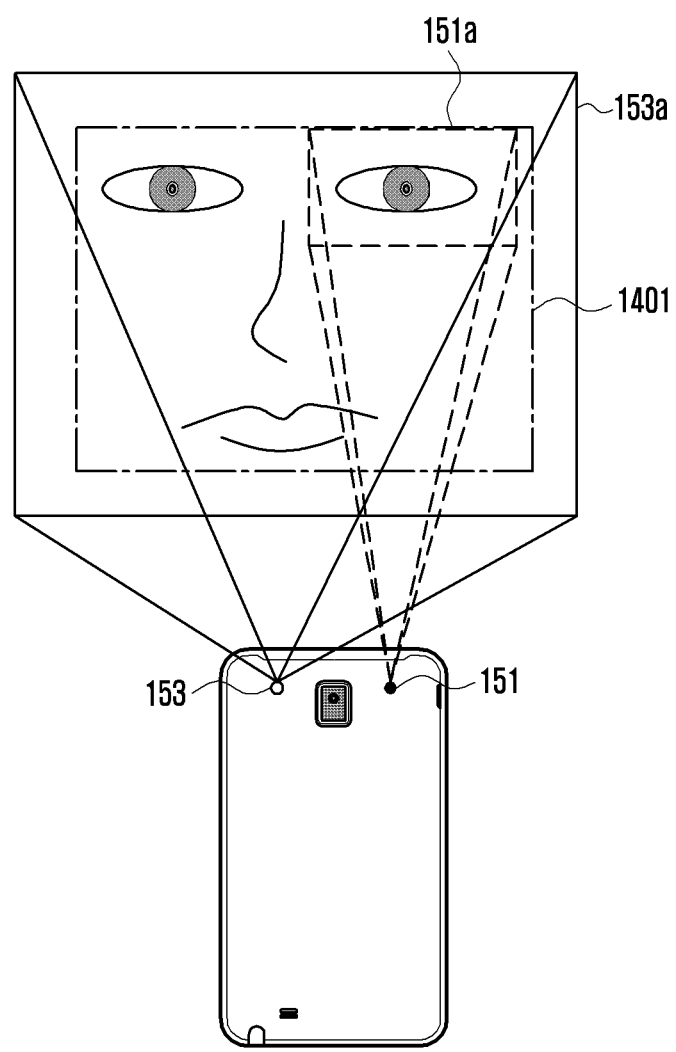
FIGS. 14A and 14B are diagrams illustrating a method for recognizing an iris, according to an embodiment of the present invention.
Figure 14B:
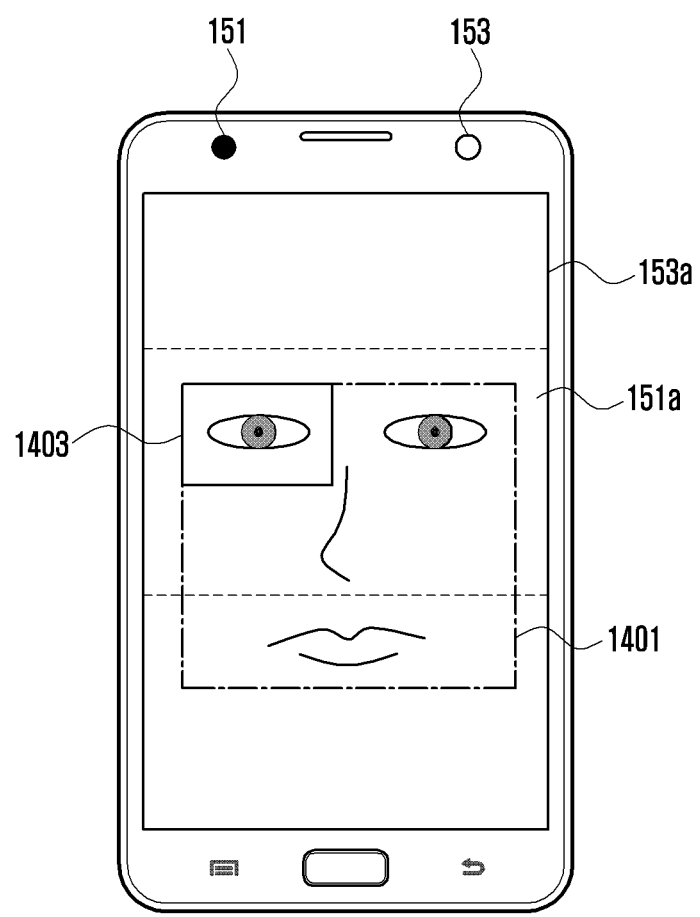

FIGS. 14A and 14B are diagrams illustrating a method for recognizing an iris according to an embodiment of the present invention.

Referring to FIG. 13 and FIGS. 14A and 14B, in an embodiment of the present invention, the regular camera 153 is driven to perform face recognition and when a user corresponding to the recognized face exists, the iris recognition camera 151 is driven to perform iris recognition.

That is, since the accuracy of face recognition is, in general, relatively low in comparison with the accuracy of iris recognition, in an embodiment of the present invention, an authentication process is performed twice (e.g., perform iris recognition, after performing face recognition), such that security can be enhanced.

The controller 160 detects the request of iris recognition at step 1301. The controller 160 drives the regular camera 153 to perform face recognition, as shown in 1401 of FIG. 14A, at step 1303. The face recognition is performed by extracting a face area from the subject captured through the regular camera 153, and by obtaining face information from the face area based on the distance and the shape of an eye, a nose, and a mouth. The controller 160 decides whether a user corresponding to the obtained face information exists among the user face information registered and stored in the electronic apparatus, at step 1305. When the user corresponding to the obtained face information exists, the controller 160 drives the iris recognition camera 151 to perform iris recognition as shown in 1403 of FIG. 14B, at step 1307. Since the operation of performing iris recognition is identical to the above described steps 611 to 617 of FIG. 6, a description thereof is omitted.

On the other hand, when the user corresponding to the obtained face information does not exist, the controller 160 terminates the iris recognition operation. That is, the controller 160 does not perform iris recognition by not driving the iris recognition camera 151. It is illustrated that the iris recognition camera 151 is not driven when a user corresponding to the obtained face information among the registered user face information does not exist, but it is not limited thereto and the infrared light emitting diode 152 may not be driven.

The method and the apparatus for recognizing an iris in an electronic apparatus, according an embodiment of the present invention, displays an iris area captured from an iris recognition camera as a color image identical to an image of a user's eyes, by using a regular camera, thereby improving usability for the user.

In addition, the method and the apparatus for recognizing an iris in an electronic apparatus, according an embodiment of the present invention, displays an iris recognition area on a screen, thereby performing the iris recognition accurately and quickly.

Although embodiments of the present invention have been described in detail herein, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method comprising:
   obtaining, at a mobile communication device, a first image corresponding to an object external to the mobile communication device using an iris camera in response to a request with respect to iris recognition;
   obtaining, at the mobile communication device, a second image corresponding to the object using a regular camera in response to detecting an iris in the first image obtained using the iris camera;
   displaying, at the mobile communication device, at least a portion of the second image via at least a portion of an iris recognition area related to the iris camera; and
   performing, at the mobile communication device, iris recognition using an iris detected from the object based on the first image,
   wherein performing iris recognition comprises adjusting a timing of an infrared light emitting diode to emit light according to a location of the detected iris based on the iris recognition area, and
   wherein adjusting the timing of the infrared light emitting diode to emit light comprises:
   emitting light to a top of an input frame, when the detected iris is located above the iris recognition area;
   emitting light to a bottom of the input frame, when the detected iris is located below the iris recognition area; and
   emitting light to a middle of the input frame, when the detected iris is located to a left side or a right side of the iris recognition area.

2. The method of claim 1, wherein performing iris recognition comprises:
   obtaining the iris using the first image.

3. The method of claim 1, wherein iris recognition is performed when the iris is detected in at least the portion of the iris recognition area.

4. The method of claim 1, wherein displaying at least a portion of the second image comprises:
   cutting the second image into a shape corresponding to the iris recognition area.

5. The method of claim 1, wherein displaying at least a portion of the second image comprises:
   displaying a specified graphical user interface (GUI) representing the iris recognition area.

6. The method of claim 5, wherein displaying at least a portion of the second image comprises:

displaying another specified GUI over the iris recognition area.

7. The method of claim 5, wherein the other GUI is displayed in an area in which the iris is to be obtained.

8. The method of claim 5, wherein displaying at least a portion of the second image comprises:
displaying a graphical object over the iris recognition area.

9. The method of claim 5, further comprising providing a guide information related to a location of the iris.

10. The method of claim 1, wherein obtaining the first image comprises:
emitting, using the infrared light emitting diode, an infrared light corresponding to a specified wavelength.

11. A mobile communication device for recognizing an iris, the mobile communication device comprising:
an iris camera;
a regular camera;
a display; and
a controller configured to:
obtain a first image corresponding to an object external to the mobile communication device using the iris camera in response to a request with respect to iris recognition,
obtain a second image corresponding to the object using the regular camera in response to detecting an iris in the first image obtained using the iris camera,
display at least a portion of the second image via at least a portion of an iris recognition area related to the iris camera,
perform iris recognition using an iris detected from the object based on the first image,
adjust a timing of an infrared light emitting diode to emit light according to a location of the detected iris based on the iris recognition area,
emit light to a top of an input frame, when the detected iris is located above the iris recognition area,
emit light to a bottom of the input frame, when the detected iris is located below the iris recognition area, and
emit light to a middle of the input frame, when the detected iris is located to a left side or a right side of the iris recognition area.

12. The mobile communication device of claim 11, wherein the controller is further configured to:
obtain the iris using the first image, if the iris is detected in at least a portion of the iris recognition area.

13. The mobile communication device of claim 12, wherein the controller is further configured to:
obtain a third image corresponding to the object using the iris camera, if the iris is not detected in at least the portion of the iris recognition area.

14. The mobile communication device of claim 11, wherein the controller is further configured to:
perform iris recognition when the iris is detected in at least a portion of the iris recognition area.

15. The mobile communication device of claim 11, wherein the controller is further configured to:
cut the second image into a shape corresponding to the iris recognition area as at least part of displaying the second image.

16. The mobile communication device of claim 11, wherein the controller is further configured to:
display a specified graphical user interface (GUI) representing the iris recognition area.

17. The mobile communication device of claim 16, wherein the controller is further configured to:
display a graphical object over the iris recognition area as at least part of displaying the specified GUI.

18. The mobile communication device of claim 16, wherein the controller is further configured to:
provide a guide information related to a location of the iris when displaying the specified GUI.

19. The mobile communication device of claim 11, further comprising the infrared light emitting diode to emit an infrared light corresponding to a specified wavelength as at least part of obtaining the first image.

20. A non-transitory computer-readable storage medium storing instructions that, when executed by one or more processors, cause the one or more processors to perform operations comprising:
obtaining, at a mobile communication device, a first image corresponding to an object external to the mobile communication device using an iris camera in response to a request with respect to iris recognition;
obtaining, at the mobile communication device, a second image corresponding to the object using a regular camera in response to detecting an iris in the first image obtained using the iris camera;
displaying, at the mobile communication device, at least a portion of the second image via at least a portion of an iris recognition area related to the iris camera; and
performing, at the mobile communication device, iris recognition using an iris detected from the object based on the first image,
wherein performing iris recognition comprises adjusting a timing of an infrared light emitting diode to emit light according to a location of the detected iris based on the iris recognition area, and
wherein adjusting the timing of the infrared light emitting diode to emit light comprises:
emitting light to a top of an input frame, when the detected iris is located above the iris recognition area;
emitting light to a bottom of the input frame, when the detected iris is located below the iris recognition area; and
emitting light to a middle of the input frame, when the detected iris is located to a left side or a right side of the iris recognition area.

* * * * *